C. PAYNE.
SALTING ANIMAL MATTER.
No. 2,247. Patented Sept. 11, 1841.
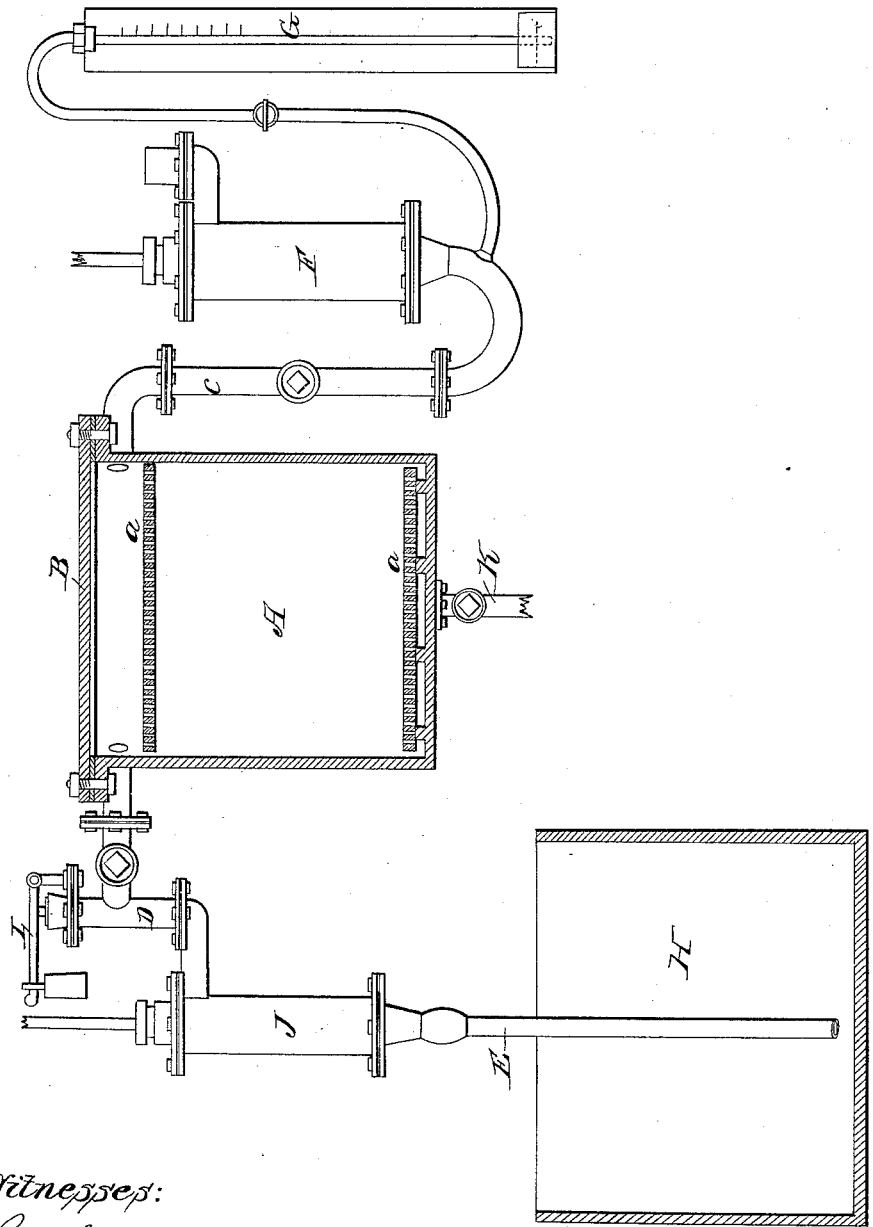

UNITED STATES PATENT OFFICE.

CHARLES PAYNE, OF SOUTH LAMBETH, ENGLAND.

MODE OF SALTING ANIMAL MATTER.

Specification of Letters Patent No. 2,247, dated September 11, 1841.

*To all whom it may concern:*

Be it known that I, CHARLES PAYNE, a subject of the Queen of Great Britain, and now residing at South Lambeth, in the county of Surrey, within the said Kingdom, gentleman, have invented or discovered certain new and useful Improvements in Salting Animal Matters; and I, the said CHARLES PAYNE, do hereby declare that the nature of my said invention and the manner in which the same is to be performed are fully described and ascertained in and by the following statement thereof, reference being had to the drawing hereunto annexed and to the figures and letters marked thereon—that is to say:

My invention relates to a mode of preserving meat by submitting it when in a vacuous vessel to the action of the proper brine or preservative materials under pressure and in order to give the best information in my power I will proceed to describe the drawing hereunto annexed.

*Description of the drawing.*—A is the vessel of the machine and may be termed the receiver. It may be of any convenient shape. Into this the meat is put, filling it or not first placing a false bottom perforated with holes below and a similar perforated plate over the meat, these plates are marked *a*.

B is the top or lid or man hole of the machine which is fastened down and made air tight.

C is a pipe for connecting an air pump with the machine.

D is a pipe connecting the reservoir of brine with the machine.

E is the suction pipe of the pressure pump.

F is an air pump communicating with machine by the pipe C.

G is a mercurial gage of the air pump.

H is a vessel containing the brine to be used into which the end of pipe D is inserted.

I is a safety valve indicating the pressure.

J is the pressure pump.

K is a pipe running from the bottom of the machine to a vat or vessel below for the discharged brine each pipe has a stop cock.

I will now describe the mode of working with the machine. The brine is to be mixed of the proportions required and as is well understood when curing meat and put into the vessel H. The meat is to be placed in the receiver A and the lid well secured. The cocks are to be all turned off except that of the air pump. The vessel A is to be exhausted of the air till the gage shows a vacuum of about twenty seven inches then turn off the cock. Admit the brine from the vessel H till the vessel A is full and turn off the cock then use the pressure pump till the pressure desired is attained. Allow all to remain for about fifteen minutes then turn the cock of pipe K one half allowing the brine to filter into the vat below keeping up the pressure for a few minutes by using the pressure pump after which open the manhole and let the brine run freely out which finishes the process.

I would in conclusion remark that the pressure may be obtained by any convenient means such as by a column of liquid by pump by screw and piston vacuum may be obtained by air pump by steam and condensation or other convenient means. But

What I claim is—

1. The mode of preserving animal substances by means of a vessel A combined with an air pump for exhausting it and a reservoir containing brine the whole being constructed and operating in the manner set forth.

2. Also the method of constructing the reservoir *a* with a false bottom perforated with apertures in combination with the pressure pump for forcing the brine through the animal matters.

CHAS. PAYNE.

Witnesses:
W. H. RITCHIE,
JNO. ALCOCK.